United States Patent [19]

Semba

[11] Patent Number: 5,504,726
[45] Date of Patent: Apr. 2, 1996

[54] METHOD AND APPARATUS FOR CALIBRATING FOCUS AND TRACKING ERROR SIGNALS IN AN OPTICAL DRIVE WITH MEASURING OFFSETS DURING TRACK JUMPS

[75] Inventor: Tetsuo Semba, Zama, Japan

[73] Assignee: International Business Machines Corporation, Armonk, N.Y.

[21] Appl. No.: 223,564

[22] Filed: Apr. 6, 1994

[30] Foreign Application Priority Data

Apr. 23, 1993 [JP] Japan .................................. 5-097519

[51] Int. Cl.⁶ .................................................. G11B 7/095
[52] U.S. Cl. .................................. 369/44.28; 369/44.29; 369/44.34
[58] Field of Search ............................. 369/44.28, 44.29, 369/44.34, 44.35, 44.36

[56] References Cited

U.S. PATENT DOCUMENTS

| | | | |
|---|---|---|---|
| 4,707,648 | 11/1987 | Minami | 369/44.35 X |
| 5,048,002 | 9/1991 | Horie et al. | 369/44.35 |
| 5,097,458 | 3/1992 | Suzuki | 369/44.35 X |
| 5,164,932 | 11/1992 | Fennema et al. | 369/44.29 |
| 5,343,454 | 8/1994 | Watanabe et al. | 369/44.29 X |
| 5,351,224 | 9/1994 | Nagata et al. | 369/44.29 |

FOREIGN PATENT DOCUMENTS 4232624  8/1992  Japan .
4278233  10/1992  Japan .

OTHER PUBLICATIONS

Patent Abstracts of Japan, vol. 17, No. 54, p. 1480, Feb. 3, 1993, & JP 4-265532.

"86 mm Magneto-Optical Disk Drive", Nakashima, et al., SPIE, vol. 1316 Optical Data Storage, pp. 16–29 (1990).

"Drive Control Technology in 90 mm Optical Disk Drive", Yoshimoto, et al., Mitsubishi Electric's Technological Report, vol. 66, No. 6, pp. 629–633 (1992).

Primary Examiner—W. R. Young
Attorney, Agent, or Firm—D. A. Shifrin

[57] ABSTRACT

The present invention makes possible the calibration of the tracking error signal and the focus error signal repeatedly when an optical disk drive is in the normal operation mode. Errors (offset and amplitude error) of the focus error signal and the tracking error signal are detected during at least three track jumps by making use of a track jump performed once per rotation of disk in the track following mode. An offset value of the focus error signal is calculated based on the amplitude of a tracking error signal generated during at least two track jumps by adding a positive or negative offset to the original target value of the focus error signal, and values of offset and amplitude error of the tracking error signal are calculated based on a maximum value and a minimum value of a tracking error signal generated during at least one track jump without modifying the original target value of the focus error signal.

14 Claims, 6 Drawing Sheets

METHOD AND APPARATUS FOR CALIBRATING FOCUS AND TRACKING ERROR SIGNALS IN AN OPTICAL DRIVE WITH MEASURING OFFSETS DURING TRACK JUMPS

TECHNICAL FIELD OF THE INVENTION

The present invention relates to an optical disk drive having a function of calibrating a focus error signal and a tracking error signal.

BACKGROUND OF THE INVENTION

In an optical disk drive, the tracking servo control and the focus servo control are performed so as to make a light beam spot follow the surface deflection of an optical disk and the runout of a track. The position of a beam spot is controlled so that a tracking error signal becomes zero in the tracking servo system and a focus error signal becomes zero in the focus servo system.

At present, in optical disk drives, the disk for storing data can be removed and another disk loaded. For this reason, the optimum parameters of the servo system are not always constant. In addition, since disk characteristics are not uniform, the drive should perform a self-calibration so that the parameters of the servo system are optimized.

Tracking error signals and focus error signals are calibrated each time a disk is loaded so that reading, writing, and access can be performed correctly even in cases where disk characteristics are not uniform. Since there are cases where characteristics are not uniform even on one disk, it has been typical to perform calibration at several places in one disk. Calibration has not been convenient because, after a disk was loaded, it took several seconds in some cases before it was possible to read and write data.

Several calibration methods have been proposed.

First, a method disclosed in "86 mm Magneto-optical Disk Drive," Nakashima et al, SPIE Vol. 1316, Optical Data Storage, pp. 16–29 (1990) is explained. The amplitude (TEp-p)det of a tracking error signal to be generated by disk runout with the tracking servo OFF and the focus servo ON each time a disk is loaded is detected and it is compared with a desired value (TEp-p)typ so as to obtain the specification coefficient Cte=(TEp-p)typ/(TEp-p)det. Next, the signal level of pre-pit to be reproduced by adding an offset to the tracking error signal is checked and positive and negative offset values in levels a level lower than the maximum value are taken as OFFSET1 and OFFSET2 and the center value is taken as OFFSETte, a detection offset. With these, the calibrated tracking error signal TEcal can be calculated by TEcal=Cte * Cagc , (TE−OFFSETte). Here, Cagc is a compensation coefficient because the signal level of pre-pit greatly depends on the laser intensity. For the focus error signal, the amplitude of an S-shaped curve is measured by moving the objective lens up and down each time a disk is loaded and treatment similar to that of the tracking error signal is performed.

However, this procedure takes time because the amplitude of the tracking error signal cannot be detected unless the tracking servo is turned off first. There is an additional drawback in that the response is delayed when a request for reading and writing data is made even if calibration is performed while the data reading or writing operation is not being carried out. In addition, if noise due to defects and dispersion of a disk is present during amplitude detection, it appears as a calibration error. That is, this literature does not show an effective noise removal method.

A noise removal method is proposed in "Drive Control Technology in 90 mm Optical Disk Drive," Yoshimoto et al, Mitsubishi Electric's Technological Report, Vol. 66, No. 6, pp. 629–633 (1992). In this reference, a method is described for removing the influence of noise and compensating an offset of the tracking error signal by repeating track jumps many times in one rotation of a disk and measuring a maximum value and a minimum value of the tracking error signal and averaging them. However, there have been problems in that the measurement of an offset value to be canceled is carried out at the point when a disk is loaded, and it takes several seconds until it is possible to read and write data. Furthermore, it also has had a problem similar to that of the first reference in that the offset change with the time passage could not be treated. In addition, this literature does not show a calibration method regarding the amplitude of the tracking error signal and the offset of the focus error signal.

In PUPA No. 4-278233 gazette, the offset value is calculated in accordance with a maximum value and a minimum value of a tracking error signal generated during a seek operation and a track jump as a method for canceling an offset included in the tracking error signal of an optical disk drive. For the calculation method, a maximum value and a minimum value of the tracking error signal are held in a sample hold circuit at the timing of positive peak and negative peak, respectively, and their mean value is stored as an offset value or added directly to the tracking error signal. In the former case, the track address is also detected and stored by making it correspond to the offset value. The stored value is read at a later time and the offset is canceled in the same method as the latter case.

However, in this method, a maximum value and a minimum value of an improper tracking error signal may be detected when a defect is generated on a disk. There is, therefore, a possibility of setting the offset value of the tracking error signal to an improper value.

PUPA No. 4-232624 gazette discloses a method for acquiring an optimum focus by repeating measurements of the amplitude of the tracking error signal until the difference between the two tracking error signals obtained becomes small enough in a state where positive and negative increments are added to the focus error signal, and for determining a compensation value of the focus error signal.

However, it is also difficult to deal with the time fluctuation the offset of the focus error signal in this method. In addition, it takes time because the difference of the tracking error signal converges.

None of the above references disclose a method for performing calibration of the tracking error signal and the calibration of the focus error signal in a unified manner. Therefore, the calibration of those signals has to be performed separately by different methods, each contributing to the total time required for calibration.

In addition, none of the above references disclose the use of a tracking error signal generated upon a track jump in the track following mode for the calibration of the tracking error signal and the focus error signal.

OBJECTS AND SUMMARY OF THE INVENTION

In view of the foregoing, it is an object of the invention to make possible the calibration of the tracking error signal and the focus error signal repeatedly in the ordinary operation mode of an optical disk drive. More specifically, the subjects of calibration are the offset of the focus error signal and the offset and amplitude of the tracking error signal.

Another object of the invention is to reduce the time between loading an optical disk to being able to read and write data.

Still another object of the invention is to make the parameter of the servo system follow the optical disk drive even if its state changes with time.

Still another object of the invention is to respond for calibration without delay even if there is a request for reading and writing data.

These and other objects are achieved in the present invention by providing an optical disk drive according to one embodiment of the invention which comprises:

a tracking actuator, means for generating a tracking error signal, tracking servo means for compensating an offset and an amplitude error of the tracking error signal and generating a drive signal for said tracking actuator in accordance with the compensated tracking error signal, a focus actuator, means for generating a focus error signal, focus servo means for compensating an offset of the focus error signal and generating a drive signal for said focus actuator based on the compensated focus error signal, means for issuing a track jump command to said tracking servo means to follow a given track, means for transferring the value in which a positive value is added to the previously obtained offset value of the focus error signal to said focus servo means during at least one track jump in said track following mode, means for transferring the value in which a negative value is added to said previously obtained offset value of the focus error signal to said focus servo means as an offset value during at least one track jump in said track following mode, means for transferring said previously obtained offset value of the focus error signal to said focus servo means without modifying it during at least one track jump in said track following mode, means for calculating a new offset value of the focus error signal based on the amplitude of a tracking error signal generated at a track jump performed by modifying the offset value of the focus error signal in said track following mode, and means for calculating new values of offset and amplitude error of the tracking error signal based on the maximum value and the minimum value of tracking error signal generated at a track jump performed without modifying the offset value of the focus error signal in said track following mode.

An optical disk drive of the invention further stores the output of said calculation means in a memory location which is determined by the address of said given track and uses it in the next calibration.

According to the invention, an optical disk drive detects errors (offset and amplitude error) of the focus error signal and the tracking error signal during at least three track jumps by making use of a track jump performed once per rotation of the disk in the track following mode. Furthermore, the influence of noise is removed by combining the newly detected error with the previously detected value.

Therefore, in the past, the execution of calibration was limited to the time of disk loading, but according to the present invention, the tracking error signal and the focus error signal can be repeatedly calibrated during ordinary operations, such as reading and writing data. In addition, it is not necessary to provide a calibration mode at the time of disk loading. The time from loading an optical disk in an optical disk drive until it is possible to read and write data can be reduced. Furthermore, it becomes possible to make the parameter of the servo system follow the change in the state of the optical disk drive even if the disk is kept loaded for a long time.

The foregoing and other features and advantages of the invention will be apparent from the following more particular description of preferred embodiments of the invention, as illustrated in the accompanying drawings.

DETAILED DESCRIPTION OF THE INVENTION

Figure 1:
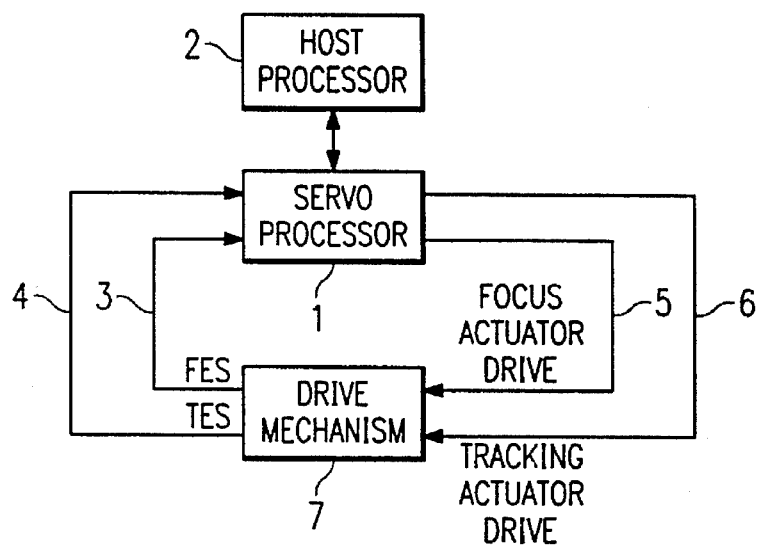
FIG. 1 is a block diagram illustrating an optical disk drive according to one embodiment.

FIG. 1 is a block diagram of an embodiment of the present invention. The tracking servo control and the focus servo control are carried out using a servo processor 1 which comprises a digital signal processor, etc. A host processor 2 issues commands, such as track jump and track access, to the servo processor 1. A focus error signal (FES) 3 and a tracking error signal (TES) 4 are inputted to the servo processor 1. The FES and TES are generated by well-known means, such as quadrant detector and two-piece detector. The servo processor 1 compensates the offset of the FES and the offset and amplitude error of the TES and further performs the processing of phase compensation, etc.; the servo processor 1 then outputs a drive signal for a focus actuator 5 and a drive signal for a tracking actuator 6.

The drive signal for the focus actuator 5 is inputted to the focus actuator 5 and a drive signal for the tracking actuator 6 is inputted to the tracking actuator 6. In FIG. 1, the focus actuator 5 and the tracking actuator 6 are incorporated in a drive mechanism 7.

In this optical disk drive, the focus servo and the tracking servo are turned on unless a servo cancel command is issued by the host processor 2. In addition, since the disk track is made in spiral form, when waiting on the same track, one track jump is performed for each rotation of the disk. The focus servo and the tracking servo are also turned on upon track jump. In the embodiment illustrated, the calibration of the focus error signal 3 and the tracking error signal 4 is performed during three successive track jumps.

Figure 2:
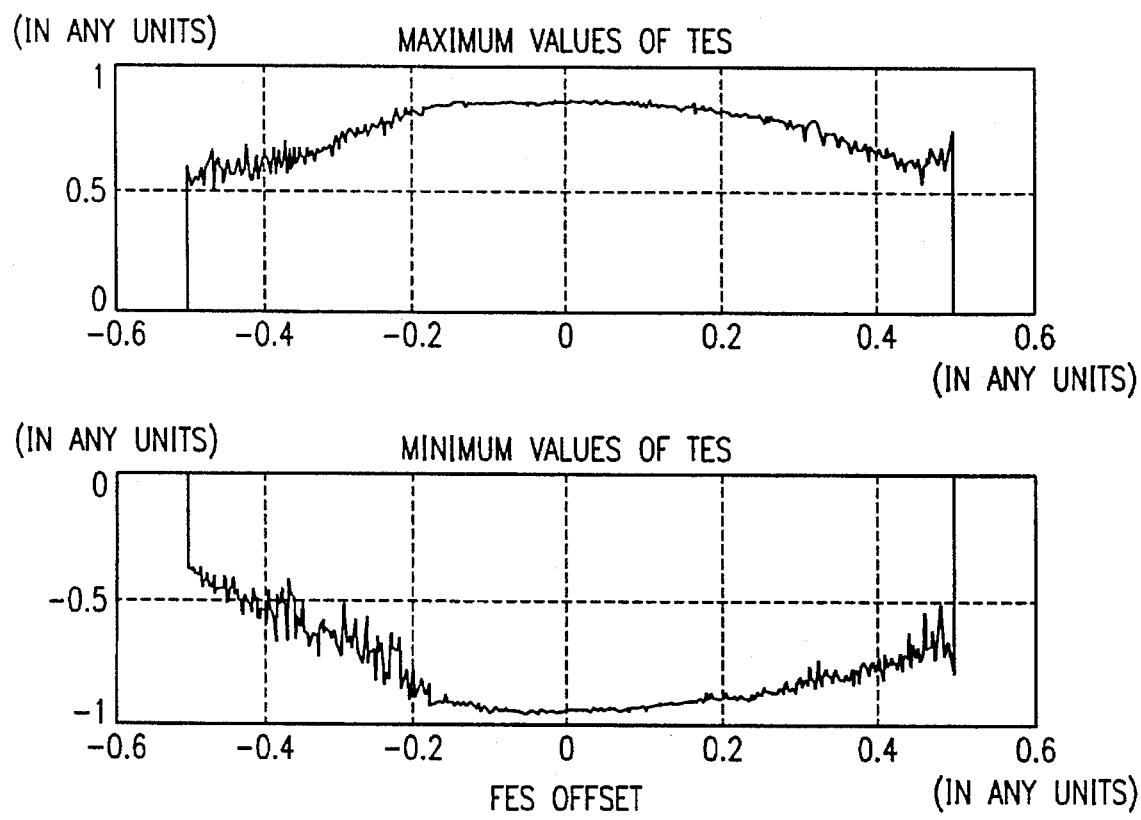
FIG. 2 is a graph illustrating a relationship between the FES offset and a maximum value and a minimum value of the TES.

FIG. 2 shows the maximum and minimum values of the tracking error signal 4 when track jump is performed by changing offset values to be canceled from the focus error signal 3. When the amplitude of the tracking error signal 4 is at its maximum, the focus is in the optimum focus state.

According to the embodiment, to measure the offset value at this time, the value in which a positive value is added to the previously calculated FES offset value is transferred to the servo processor 1 in the track following mode, and track jump is performed once. The previously calculated FES offset value is read from a memory location which is determined by the address of the currently following track (hereafter referred to as the current track). Next, the value in which a negative value is added to the previously calculated offset value is transferred to the servo processor 1, and track jump is performed once. The offset value in the best focus state is calculated based on the amplitude of a tracking error signal generated at these two track jumps, and an FES offset value to be used later for the focus servo control is calculated by combining this value with the previously calculated offset value.

Last, the previously calculated offset value is transferred to the servo processor 1 without modifying it, and track jump is performed once. The values of TES offset and amplitude error to be used later for the tracking servo control are calculated from the maximum and minimum values of a tracking error signal 4 generated at that time.

Figure 3:
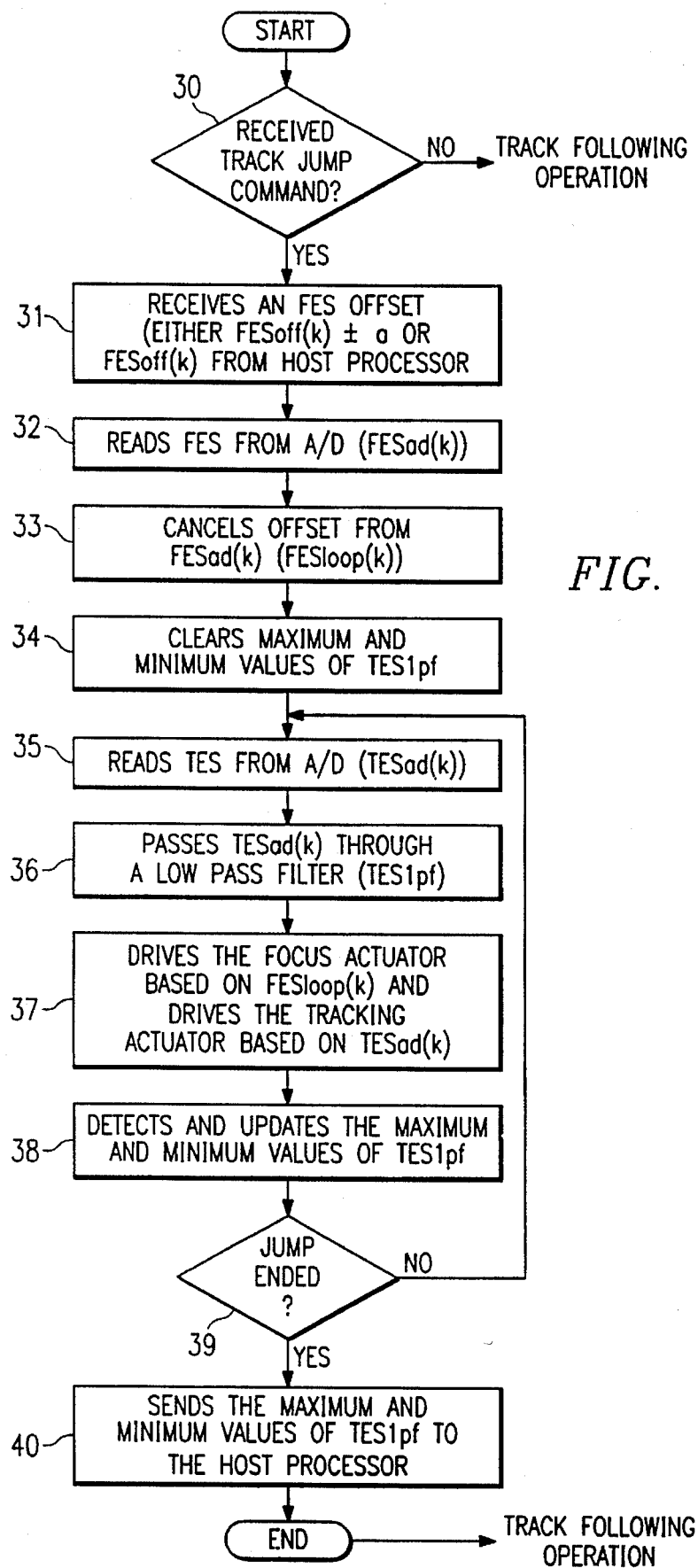
FIG. 3 is a flowchart illustrating an example of the servo processor processing.

FIG. 3 shows an example of the processing flow of the servo processor 1. Whether or not a track jump command is received from the host processor 2 is checked in step 30, and if not received, track following operation is performed.

If received, control goes to step 31 and either the FESoff(k)+a, FESoff(k)−a, or FESoff(k) value is received from the host processor 1. FESoff(k)+a is received in the first jump of the consecutive three track jumps, FESoff(k)−a is received in the second jump, and FESoff(k) is received in the last jump. Therefore, the target value of the focus error signal 3 in the first track jump is the value in which a positive offset is added to the original target value (normally, zero), and that in the second track jump is the value in which a negative offset is added to the original target value. In the third track jump, the original target value is not modified. The artificial offset, a, must be large enough so that change in the amplitude of the tracking error signal 4 can be clearly detected. In addition, FESoff(k) is the FES offset value previously calculated with respect to the current track and stored in the memory. The initial value FESoff(0) is typically zero.

In step 32, the FES 3 is read from an A/D converter. The read value is written as FESad(k) in the following description. In step 33, the offset value received in step 31 is canceled from FESad(k). The value of the FES 3 after the offset value is canceled is written as FESloop(k), and control enters a loop after the maximum and minimum values of TESlpf have been cleared as set forth in the following description.

First, TES 4 is read from the A/D converter. The read value is written as TESad(k) in the following description (step 35). Next, TESad(k) is passed through a low pass filter (step 36). Since the TES 4 resembles a sine wave at a track jump, the frequency is passed through, and the cut-off frequency of the low pass filter is set so that the noise which has a higher frequency is eliminated. The value of the TES which passed the low pass filter is written as TESlpf.

Next, a drive signal for the focus actuator 5 is generated in accordance with FESloop(k) and supplied to the focus actuator 5. At the same time, a drive signal for the tracking actuator 6 is generated in accordance with TESad(k) and supplied to the tracking actuator 6 (step 37).

In step 37, TESlpf which is obtained in step 36 is compared with the maximum value obtained so far. If TESlpf is greater than the maximum value, the maximum value is updated with the value of TESlpf, and if TESlpf is not greater than the maximum value, nothing is done. Furthermore, TESlpf is also compared with the minimum value obtained so far. If TESlpf is smaller than the minimum value, the minimum value is updated with the value of TESlpf, and if TESlpf is not smaller than the minimum value, nothing is done.

The loop keeps running until the jump ends (step 39). A jump is considered to be completed with the generation of one sine wave cycle (TES).

After escaping from the loop, control goes to step 40. The maximum and minimum values of TESlpf are sent to the host processor (step 40). After that, a normal track following operation is carried out.

Figure 4:
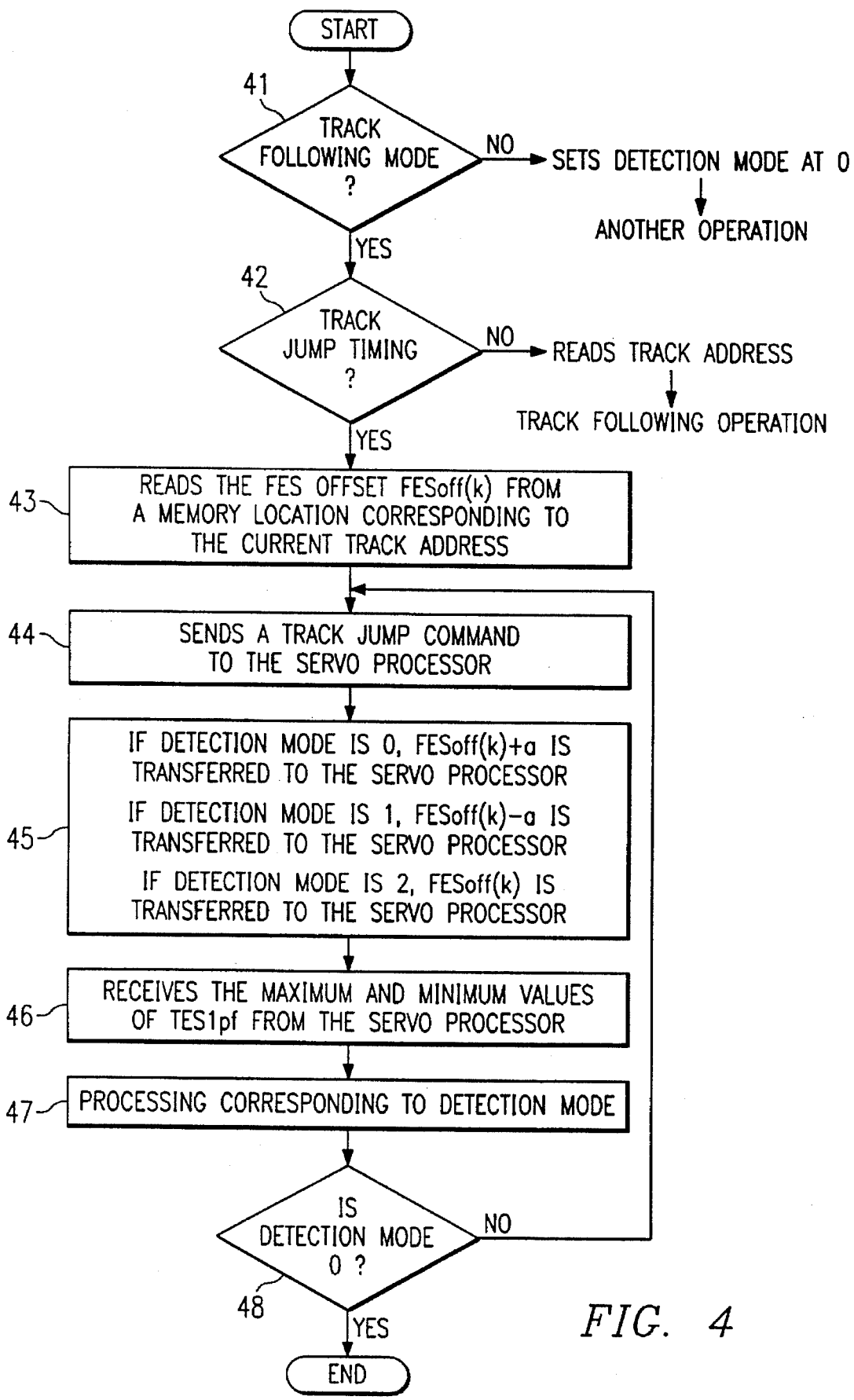
FIG. 4 is a flowchart illustrating an example of the host processor processing.

FIG. 4 shows an example of the processing flow of the host processor 2. First, whether or not the drive is in track following mode is determined (step 41). If the drive is in track following mode, control goes to step 42. If the drive is in a mode other than the track following mode, such as the loading or unloading of a disk, the sequence of the detection mode is cleared.

Figure 5:
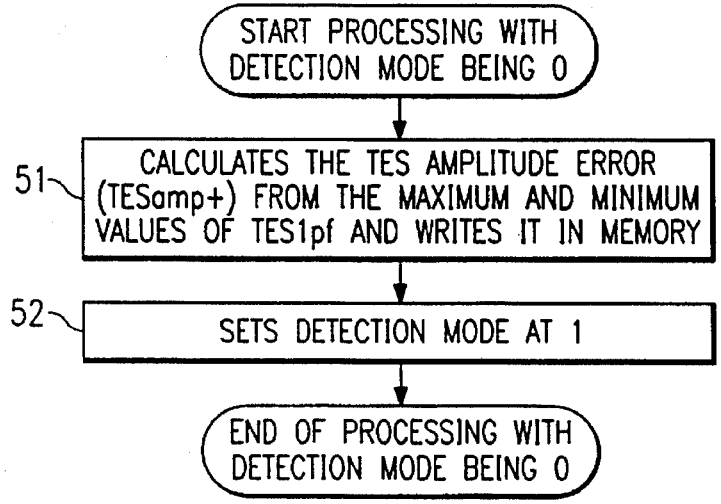
FIG. 5 is a flowchart illustrating the processing in detection mode 0.

If not at the timing of track jump in step 42, the current track address is read from a signal in which the pre-pit of the optical disk is reproduced. If at the timing of track jump, control proceeds to step 43. The FES offset value which has been written in advance is read from a memory location corresponding to the current track address. After that, a track jump command is sent to the servo processor 1, the FES offset value is transferred in accordance with the detection mode, and the detection of maximum and minimum values of TES is requested (steps 44 and 45). The detected maximum and minimum values of TESlpf are sent from the servo processor 1 to the host processor 2 (step 46). The "processing corresponding to detection mode" in step 47 means the completion of the three processing operations by the host processor 2 described with reference to FIGS. 5–7. First, FIG. 5 shows an example of the flow of the processing with the detection mode being zero (0). In step 51, the amplitude error TESamp+ of the TES 4 is calculated from the maximum and minimum values of TESlpf, which are detected in the first track jump, and written into the memory. The equation to calculate the amplitude error of TES 4 which is common to step 51 and steps 61 and 71 to be described later is as follows:

$$TESamp = (TESlpf, max - TESlpf, min)/TES0$$

Here, TES0 is a target amplitude value of the TES 4.

In step 52, the detection mode is set at 1 and the processing with detection mode being zero (0) ends.

Figure 6:
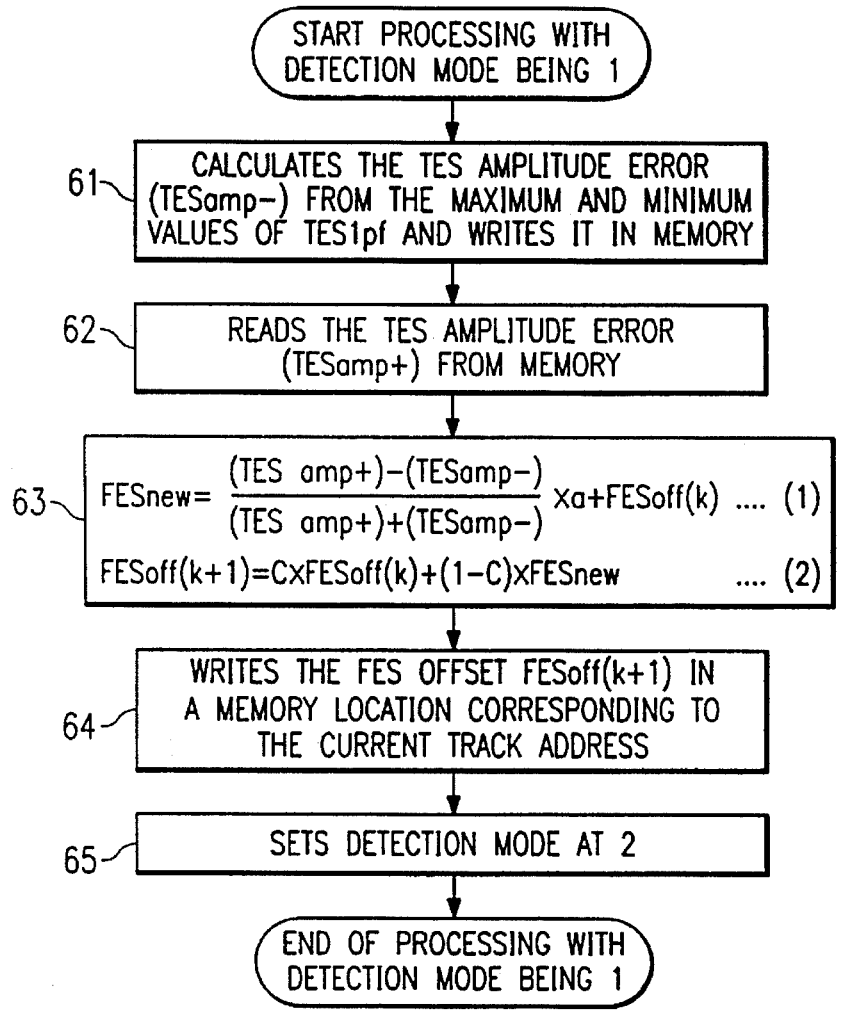
FIG. 6 is a flowchart illustrating the processing in detection mode 1.

FIG. 6 shows an example of the flow of the processing with detection mode being one (1). In step 61, the amplitude error TESamp− of the TES 4 is calculated from the maximum and minimum values of TESlpf which are detected by the second track jump. In step 62, TESamp+, which is calculated when the detection mode is zero (0), is read from the memory.

In step 63, the amplitude of the TES 4 is maximized in accordance with equation (1) shown in the figure; that is, an estimate FESnew of an offset which gives the optimum focus state is calculated. Next, a new offset value FES(k+1)

which is best suitable for later use in the focus servo control is calculated by combining FESoff(k) with FESnew in accordance with equation (2) shown in FIG. 2. Coefficient C will be discussed later. In step 64, FESoff(k+1) is written into a memory location corresponding to the current track address. In step 65, the detection mode is set at 2 and the processing with detection mode being one (1) ends.

Figure 7:
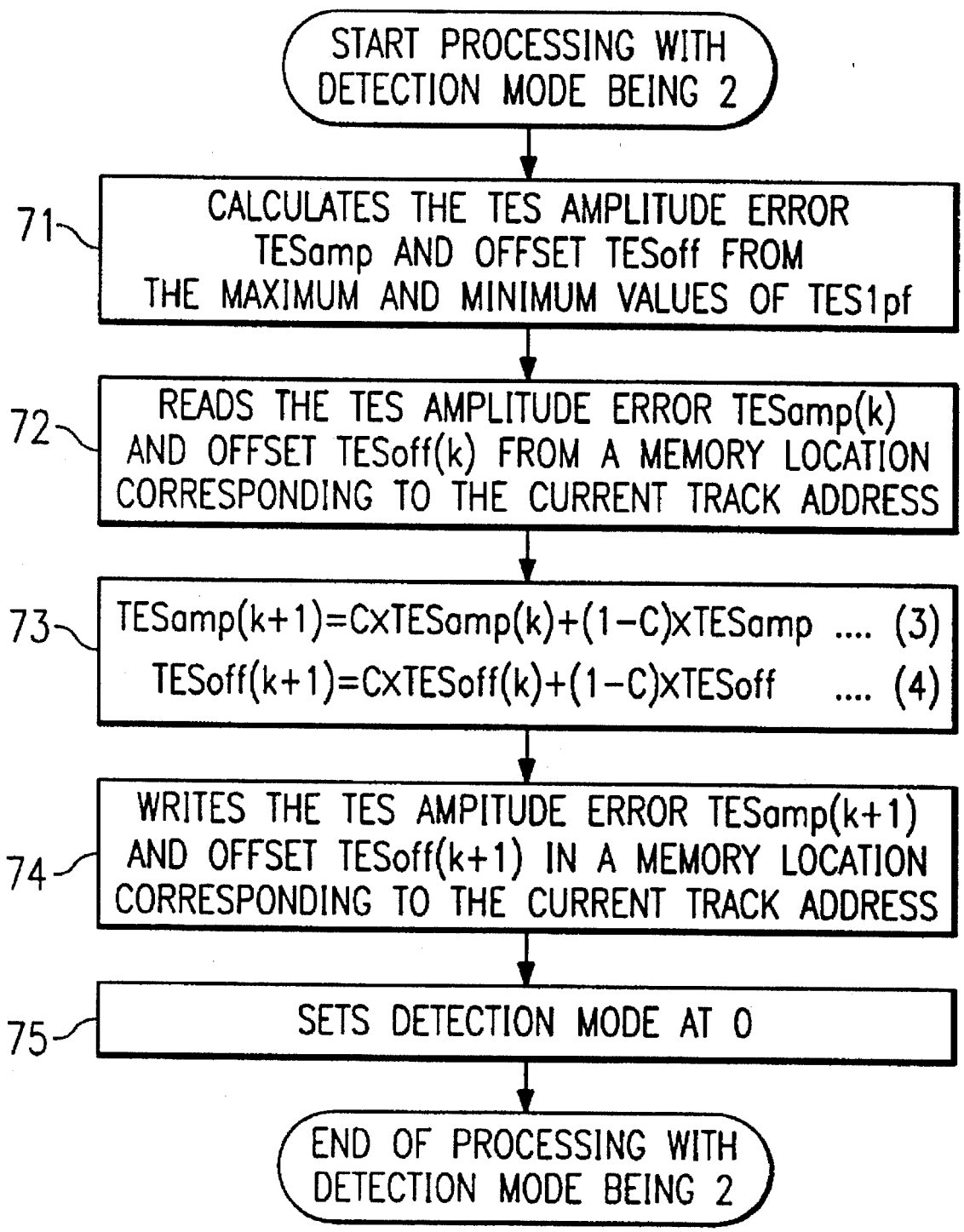
FIG. 7 is a flowchart illustrating the processing in detection mode 2.

FIG. 7 shows an example of the flow of the processing with the detection mode being two (2). In step 71, the amplitude error TESamp and offset TESoff of TES are calculated from the maximum and minimum values of TESlpf. Here, TESoff is calculated in accordance with the following equation:

$$TESoff = TESlpf, max + TESlpf, min$$

In step 72, the amplitude error TESamp(k) and offset TESoff(k) of the TES 4 are read from a memory location corresponding to the current track address. Their initial values TESamp(0) and TESoff(0) are typically zeroes. In step 73, a new amplitude error value TESamp(k+1) and a new offset value TESoff(k+1) which are best suitable for later use in the tracking servo control are calculated respectively in accordance with equations (3) and (4) shown in the figure.

The calculation results are written into a memory location corresponding to the current track address. The detection mode is set at zero (0) and the processing with the detection mode being two (2) ends.

The coefficient C used in update calculations of offset value and amplitude error value is above zero (0) and below (1). The closer the value is to zero, the quicker the response obtained. But, conversely, erroneous detection due to defects on a disk, etc., is more likely. Therefore, the coefficient C must be selected in accordance with the actual fluctuating speeds of amplitudes and offsets.

It is not necessary to store TESamp(k), TESoff(k), and FESoff(k) in the memory by changing the location for each track. The typical data of several nearby tracks can be stored in a memory location which is determined by the upper bits of their track addresses.

The amplitude error value TESamp(k+1) and offset values TESoff(k+1) and FESoff(k+1) obtained in this way are always used for the tracking servo control and the focus servo control until the next calibration is performed. That is, the tracking error signal 4 used for the tracking servo control is modified in accordance with equation (5) and the focus error signal 3 used for the focus servo control is modified in accordance with equation (6).

$$TESloop = (TESad - TESoff(k+1)) * TESamp(k+1) \quad (5)$$

$$FESloop = FESad - FESoff(k+1) \quad (6)$$

A specific embodiment was explained above, but the range of applications of the invention is not limited to this embodiment. For example, the number of track jumps performed respectively with the FES offset values being FESoff(k)+a, FESoff(k)−a, or FESoff(k) can be increased to two times or more in order to increase the measurement accuracy of FESoff(k+1), TESoff(k+1), and TESamp(k+1). However, in many cases, FESoff(k+1), TESoff(k+1), and TESamp(k+1) can be obtained accurately during one track jump, respectively, because the waveform of the tracking error signal 4 generated at a track jump in track following mode is stable, unlike that in the seek mode.

The sequence of the FES offset values to be transferred to the servo processor 1 can be FESoff(k)+2a, FESoff(k)+a, FESoff(k)−a, FESoff(k)−2a, FESoff(k) in that order. In this case, the accuracy of the estimate of the FES offset can be increased if FESnew is obtained by averaging the value of equation (1) obtained from the TES amplitude when the FES offset values are FESoff(k)+2a and FESoff(k)−2a and the value of equation (1) obtained from the FES amplitude when the FES offset values are FESoff(k)+a and FESoff(k)−a.

Figure 8:
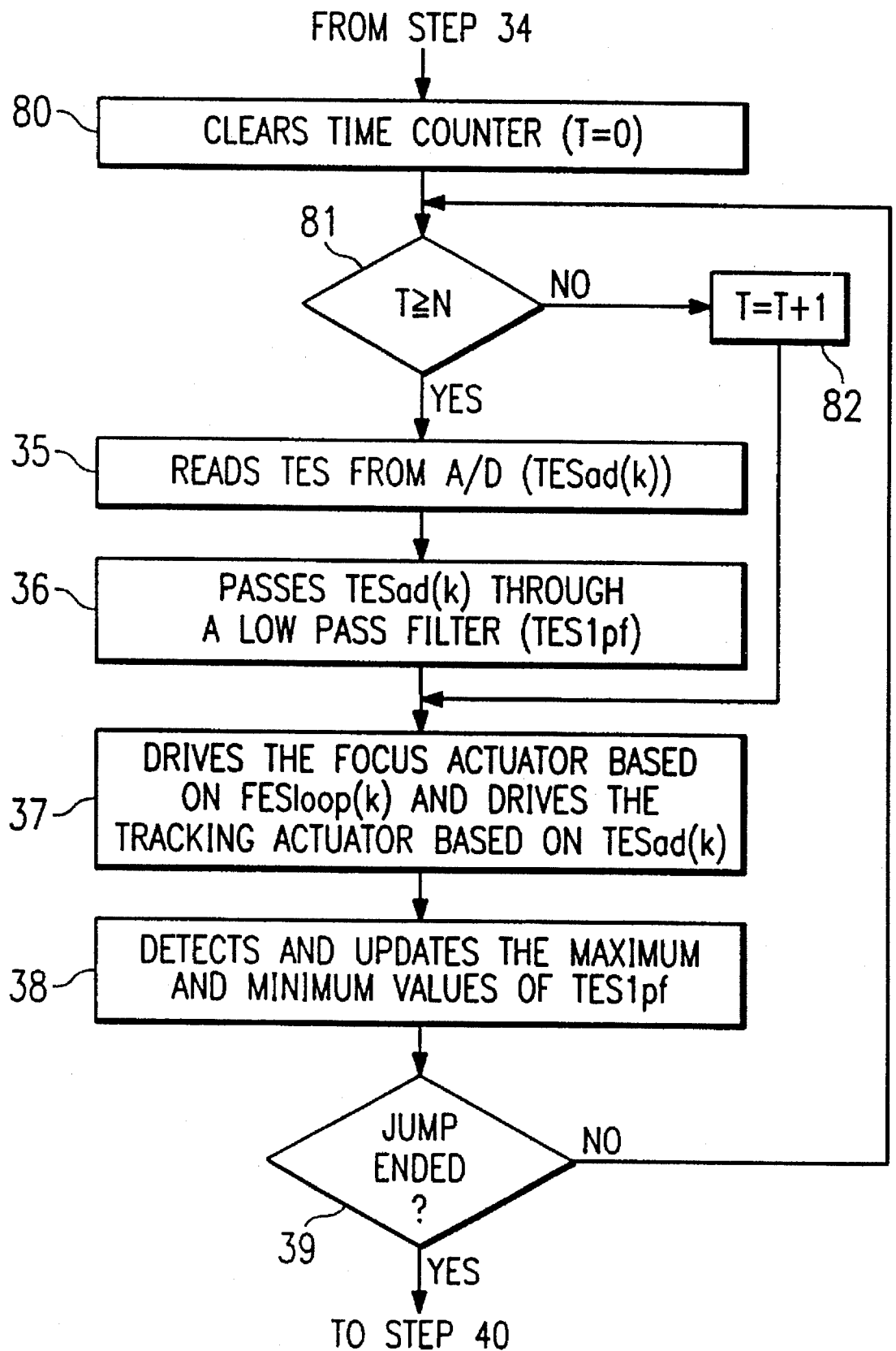
FIG. 8 is a flowchart illustrating another example of the servo processor processing.

FIG. 8 shows another example of the flow of the processing of the servo processor 1. Steps 80, 81, and 82 have been added to those in FIG. 3. In this example, the TES 4 is not read until T=N, that is, until a predetermined time passes. The tracking actuator 6 is not driven for that time. In this way, the response of the focus error signal 3 can be made faster so as not to be delayed for track jump by driving the focus actuator 5 in advance.

It is possible to repeat an operation to jump from one track to its adjacent track and jump again to back to the track where it was in track following mode for calibration even with an optical disk drive in which a disk with a non-track spiral is loaded. Since tracking error signals are generated even in such cases, the invention can be applied.

According to the invention, it becomes possible to calibrate the tracking error signal 4 and the focus error signal 3 repeatedly when an optical disk drive is in normal operation mode. In addition, the time between loading of an optical disk and becoming ready to read and write can be shortened. Furthermore, even if the state of the optical disk drive fluctuates with time, it is possible to make the parameter of the servo system follow it. In addition, even if there is a request to read and write data, it is possible to respond to it without delay for calibration.

While the invention has been particularly shown and described with reference to preferred embodiments thereof, it will be understood by those skilled in the art that various changes in form and details may be made therein without departing from the spirit and scope of the invention.

What is claimed is:

1. An optical disk drive comprising:

a tracking actuator;

means for generating a tracking error signal;

tracking servo means for compensating for offset and amplitude error in the tracking error signal and generating a drive signal for said tracking actuator based on the compensated tracking error signal;

means for issuing a track jump command to said tracking servo means to follow a predetermined track;

means for detecting a maximum value and a minimum value of a tracking error signal generated upon a track jump in a track following mode; and means for calculating new values of offset and amplitude error of the tracking error signal based on said maximum value and minimum value detected.

2. An optical disk drive as set forth in claim 1 further comprising:

a focus actuator;

means for generating a focus error signal; and focus servo means for compensating an offset of the focus error signal and generating a drive signal for said focus actuator based on the compensated focus error signal, wherein the offset of the focus error signal with respect to said predetermined track is transferred to said focus servo means upon a track jump in said track following mode.

3. An optical disk drive as set forth in claim 1 further comprising:

storage means for storing an output of said means for calculating in a memory location which is determined by the address of said predetermined track.

4. An optical disk drive as set forth in claim 1, wherein said means for calculating calculates a new value for said offset by combining a previously calculated new offset value of the tracking error signal with respect to said predetermined track with the sum of a maximum value and a minimum value of said tracking error signal, and calculates a new value for said amplitude error by combining a previously obtained amplitude error of the tracking error signal with respect to said predetermined track with the difference between a maximum value and a minimum value of said tracking error signal.

5. An optical disk drive as set forth in claim 1, wherein said means for detecting a maximum value and a minimum value of said tracking error signal has a low pass filter through which passes the tracking error signal.

6. An optical disk drive comprising:

a tracking actuator;

means for generating a tracking error signal;

tracking servo means for generating a drive signal for said tracking actuator in accordance with the tracking error signal;

a focus actuator;

means for generating a focus error signal;

focus servo means for compensating an offset of the focus error signal and generating a drive signal for said focus actuator in accordance with the compensated focus error signal;

means for issuing a track jump command to said tracking servo means to follow a predetermined track in a track following mode;

means for transferring a value, in which a positive value is added to a previously obtained offset value of the focus error signal, to said focus servo means during at least one track jump in said track following mode;

means for transferring a value, in which a negative value is added to said previously obtained offset value of the focus error signal, to said focus servo means as an offset value during at least one track jump in said track following mode;

means for detecting the amplitude of a tracking error signal generated during a track jump in said track following mode; and means for calculating a new offset value of the focus error signal in accordance with the amplitude of the tracking error signal detected by said means for detecting.

7. An optical disk drive as set forth in claim 6 further comprising a storage means for storing the output of said means for calculating in a memory location determined by an address of said predetermined track.

8. An optical disk drive as set forth in claim 6, wherein said means for calculating calculates a new offset value by combining a previously obtained offset value of the focus error signal with respect to said predetermined track with an offset value which is estimated by an estimating means from the amplitude of a tracking error signal generated during a track jump, said estimating means modifying said offset value of the focus error signal.

9. An optical disk drive as set forth in claim 6, wherein said means for detecting a tracking error signal amplitude comprises a low pass filter through which passes a tracking error signal.

10. A method for calibrating a focus error signal of an optical disk drive having a tracking actuator and a focus actuator and performing tracking servo control and focus servo control by generating a drive signal for the tracking actuator based on the tracking error signal and by generating a drive signal for the focus actuator based on the focus error signal, comprising the steps of:

performing focus servo control by modifying the original target value of the focus error signal by adding a positive offset and conducting a first set of at least one track jump in a track following mode;

performing focus servo control by modifying the original target value of said focus error signal by adding a negative offset and conducting a second set of at least one track jump in said track following mode; and calculating an offset value of the focus error signal in accordance with the amplitude of a tracking error signal generated during said first and second sets of track jumps.

11. A method for calibrating a focus error signal as set forth in claim 10 wherein said first and second sets of track jumps are carried out consecutively.

12. An optical disk drive comprising:

a tracking actuator;

means for generating a tracking error signal;

tracking servo means for compensating an offset and an amplitude error of the tracking error signal and generating a drive signal for said tracking actuator based on the compensated tracking error signal;

a focus actuator;

means for generating a focus error signal;

focus servo means for compensating an offset of the focus error signal and generating a drive signal for said focus actuator based on the compensated focus error signal;

means for issuing a track jump command to said tracking servo means to follow a predetermined track in a track following mode;

means for transferring a value, in which a positive value is added to a previously obtained offset value of the focus error signal, to said focus servo means during at least one track jump in said track following mode;

means for transferring a value, in which a negative value is added to said previously obtained offset value of the focus error signal, to said focus servo means during at least one track jump in said track following mode;

means for transferring said previously obtained offset value of the focus error signal to said focus servo means, without modifying it, during at least one track jump in said track following mode;

first means for calculating a new offset value of the focus error signal based on the amplitude of a tracking error signal generated during a track jump by modifying the offset value of the focus error signal in said track following mode; and second means for calculating new offset values and amplitude errors of the tracking error signal in accordance with a maximum value and a minimum value of a tracking error signal generated during a track jump without modifying the offset value of the focus error signal in said track following mode.

13. An optical disk drive as set forth in claim 12, further comprising a storage means for storing the outputs of said first and second means for calculating in a memory location which is determined by an address of said predetermined track.

14. A method for calibrating a focus error signal and a tracking error signal of an optical disk drive having a tracking actuator and a focus actuator and for performing tracking servo control and focus servo control by generating a drive signal for the tracking actuator based on the tracking error signal, and by generating a drive signal for the focus actuator in accordance with the focus error signal, comprising the steps of:

performing the focus servo control by modifying an original target value of the focus error signal by adding a positive offset during at least one track jump of three or more track jumps in a track following mode;

performing the focus servo control by modifying an original target value of said focus error signal by adding a negative offset during at least one track jump of said three or more track jumps;

performing the focus servo control in accordance with the original target value of said focus error signal during at least one track jump of the remaining track jumps of said three or more track jumps;

calculating an offset value of the focus error signal based on the amplitude of a tracking error signal generated during at least two track jumps by adding a positive or a negative offset to the original target value of said focus error signal; and calculating the values of offset and amplitude error of the tracking error signal in accordance with a maximum value and a minimum value of a tracking error signal generated during at least one track jump without modifying the original target value of said focus error signal.

* * * * *